US007669315B2

(12) United States Patent
Kish

(10) Patent No.: US 7,669,315 B2
(45) Date of Patent: Mar. 2, 2010

(54) APPARATUS FOR MAKING A HELICALLY WOUND CONDUCTOR

(75) Inventor: James Christopher Kish, Akron, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 553 days.

(21) Appl. No.: 11/593,785

(22) Filed: Nov. 7, 2006

(65) Prior Publication Data

US 2008/0104827 A1 May 8, 2008

(51) Int. Cl.
*B23P 19/00* (2006.01)
*H01R 43/00* (2006.01)

(52) U.S. Cl. .......................... 29/755; 29/602.1; 29/605; 29/606; 264/250; 264/272.19; 336/83; 336/175; 336/192; 336/200; 336/212; 427/116

(58) Field of Classification Search ............... 29/602.1, 29/605, 606, 755, 868; 264/250, 272.19; 336/83, 175, 192, 200, 212, 233; 427/116
See application file for complete search history.

(56) References Cited

U.S. PATENT DOCUMENTS 4,976,812 A * 12/1990 McConnell et al. ......... 156/148
6,526,859 B1 * 3/2003 Ozawa et al. .................. 87/35
7,500,345 B2 * 3/2009 Kish .......................... 57/138

* cited by examiner

*Primary Examiner*—Paul D Kim
(74) *Attorney, Agent, or Firm*—Richard B. O'Planick

(57) ABSTRACT

Apparatus for making a helically wound conductor includes a pulling mechanism for axially advancing a cable core and a guide mechanism for axially directing one or more secondary strand(s) from a location offset from the cable core toward the cable core at a common approach angle. A mandrel body is disposed at a forward end of the apparatus, the mandrel body having an axial passageway extending from a rearward to the forward end of the mandrel body dimensioned to axially receive the cable core therethrough and a forward radiused end positioned to intercept the secondary strand(s). The secondary strand(s) converge on the mandrel radiused end at a common approach angle, tangentially intersect respective locations of the mandrel radiused end, and follow the radiused end to intersect with the cable core.

17 Claims, 5 Drawing Sheets

APPARATUS FOR MAKING A HELICALLY WOUND CONDUCTOR

FIELD OF THE INVENTION

The invention relates an apparatus and method for manufacturing a helically wound conductor.

BACKGROUND OF THE INVENTION

There are commercial applications in which a wound conductor is used as an electrical conductor or antenna. Such a conductor includes a central core having multiple wires twisted around the core in an axial direction. Such constructions are typically formed by a tubular strander that twists multiple wires together to create a wound finished conductor.

Conventional tubular standers axially feed a core strand along a tubular feed core path. Multiple wire components are fed radially inward along respective feed paths to intersect the core strand. A rotation is initiated in the multiple wire components as they intersect the core. A helically twisted multi-strand conductor results.

While working well, conventionally available standers are ill-equipped to make certain wire constructions where the core strand is weak in bending rigidity and where the twist geometry of the resulting wound conductor must be carefully controlled in order to insure proper wound conductor performance characteristics. Existing standers have difficulty in maintaining the core strand and multiple wire components in the desired configuration within objective specifications. Moreover, wires brought radially inward to a core strand by means of conventional standers are generally uncontrolled and may crossover each other during the twisting operation. The wound conductor that results may be non-uniform and may exhibit performance anomalies.

Additionally, wound conductors made from existing standers are typically left with a residual twist in the wire construction. Residual twist is the force within a wire construction that makes the conductor tend to wind or unwind itself. Such forces are undesirable and removing them is important to a well-behaved cable construction and useful product.

Commercially available standers, therefore, lack the means for maintaining a proper spatial relationship between radial wires and a core strand as the radial wires are fed into an intersecting relationship with the core strand. Improper spatial relation between the feed wires and the core strand will generally result in a faulty twist geometry. Such standers further lack a means for efficiently eliminating residual twist in the resultant cable construction in order to prevent the cable from an undesirable and uncontrolled winding or unwinding.

A need accordingly exists for a tubular strander that can maintain an optimal spatial relationship between radially fed wire conductors and an axial core strand while the conductors are rotated into a wound conductor construction. Such a tubular strander should allow for careful control of the approach angle between the radial wire conductors and the conductor core and be capable of maintaining a desired pitch of finished product. Moreover, the needed apparatus should provide the means for eliminating residual twist in the wire construction and the finished product.

SUMMARY OF THE INVENTION

According to one aspect of the invention, apparatus is disclosed for making a helically wound conductor of the conductor type having an axial cable core and one or more secondary strand(s) helically wound around the cable core. The apparatus comprises: a pull mechanism for axially advancing the cable core and a guide mechanism for axially directing the secondary strand(s) from a location offset from the cable core toward the cable core at a common approach angle. A mandrel body is disposed at a forward end of the apparatus, the mandrel body having an axial passageway extending from a rearward to the forward end of the mandrel body dimensioned to axially receive the cable core therethrough and a forward radiused end positioned to intercept the secondary strand(s). The secondary strand(s) and the mandrel are rotated about the cable core.

Pursuant to another aspect of the invention, the secondary strand(s) converge on the mandrel radiused end at a common approach angle and tangentially intersect respective locations of the mandrel radiused end.

According to another aspect of the invention, an overtwister assembly is disposed to receive the helically wound conductor from the mandrel body. The overtwister assembly includes a housing having a conductor receiving inlet and a conductor discharging outlet, and one or more rotating pulley(s) disposed within the housing positioned to engage the wound conductor. Stress forces are imparted into the conductor and removed from the conductor between the housing inlet and outlet by the pulley(s), whereby conditioning the cable conductor and preventing the cable conductor from winding and unwinding in an uncontrolled manner.

Pursuant to further aspect of the invention, a method for making a wound conductor includes: feeding a cable core along a feed path; axially guiding one or more secondary strand(s) from a location offset from the cable core toward the cable core at an approach angle; routing the cable core through a forwardly disposed mandrel body; intersecting a radiused forward end of the mandrel body by the secondary strand(s); routing the secondary strand(s) over the radiused forward end of the mandrel body to an intersection with the cable core; and rotating the secondary strand(s) and the mandrel body about the cable core to create a finished wound conductor. In another aspect of the invention, the method includes imparting an overtwist into the finished wound conductor to rid the finished wound conductor of residual stress forces.

BRIEF DESCRIPTION OF THE DRAWINGS

The invention will be described by way of example and with reference to the accompanying drawings in which.

DETAILED DESCRIPTION OF THE INVENTION

Figure 1:
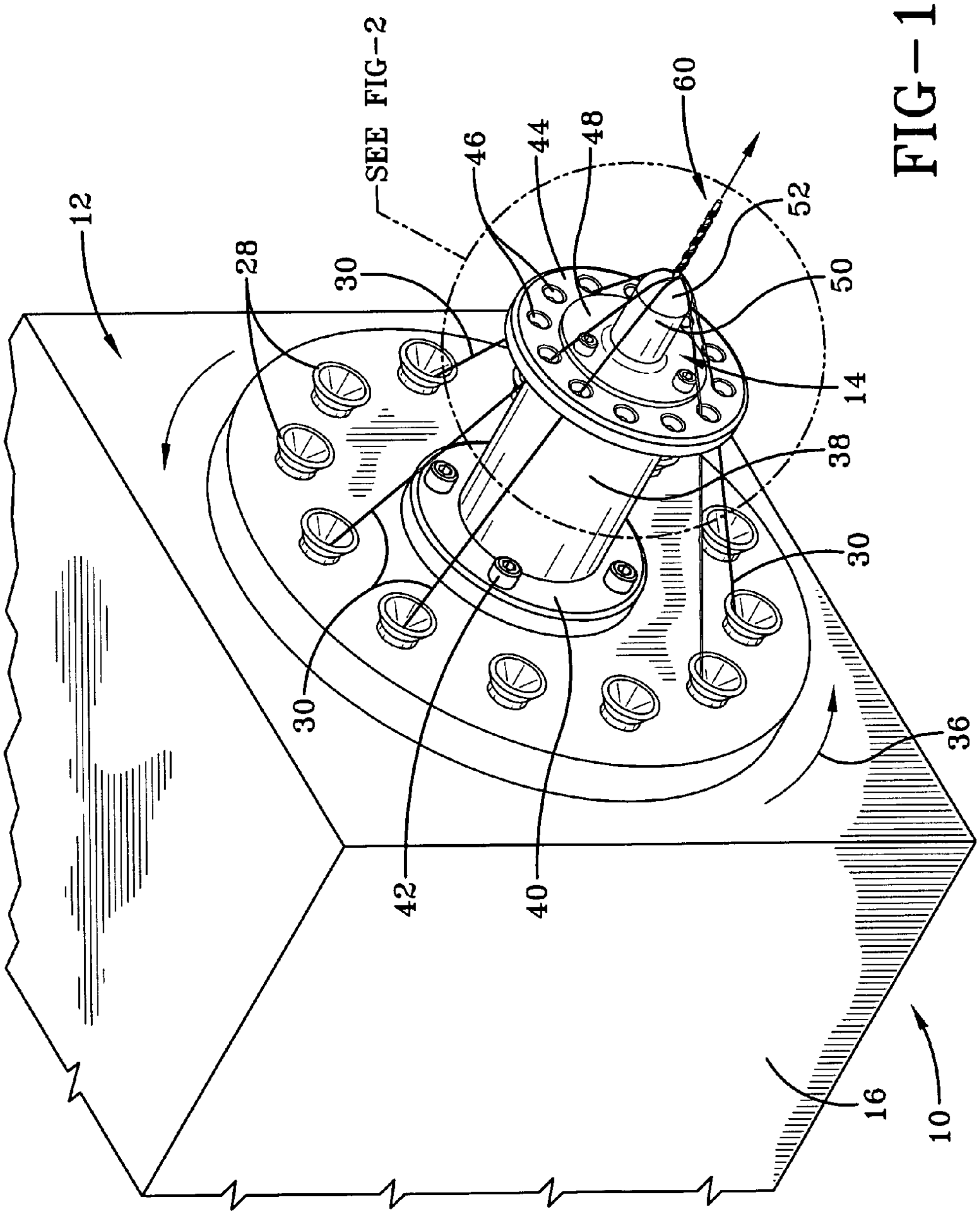
FIG. 1 is a front perspective view of a cable strander apparatus having a mandrel at the forward end.
Figure 2:
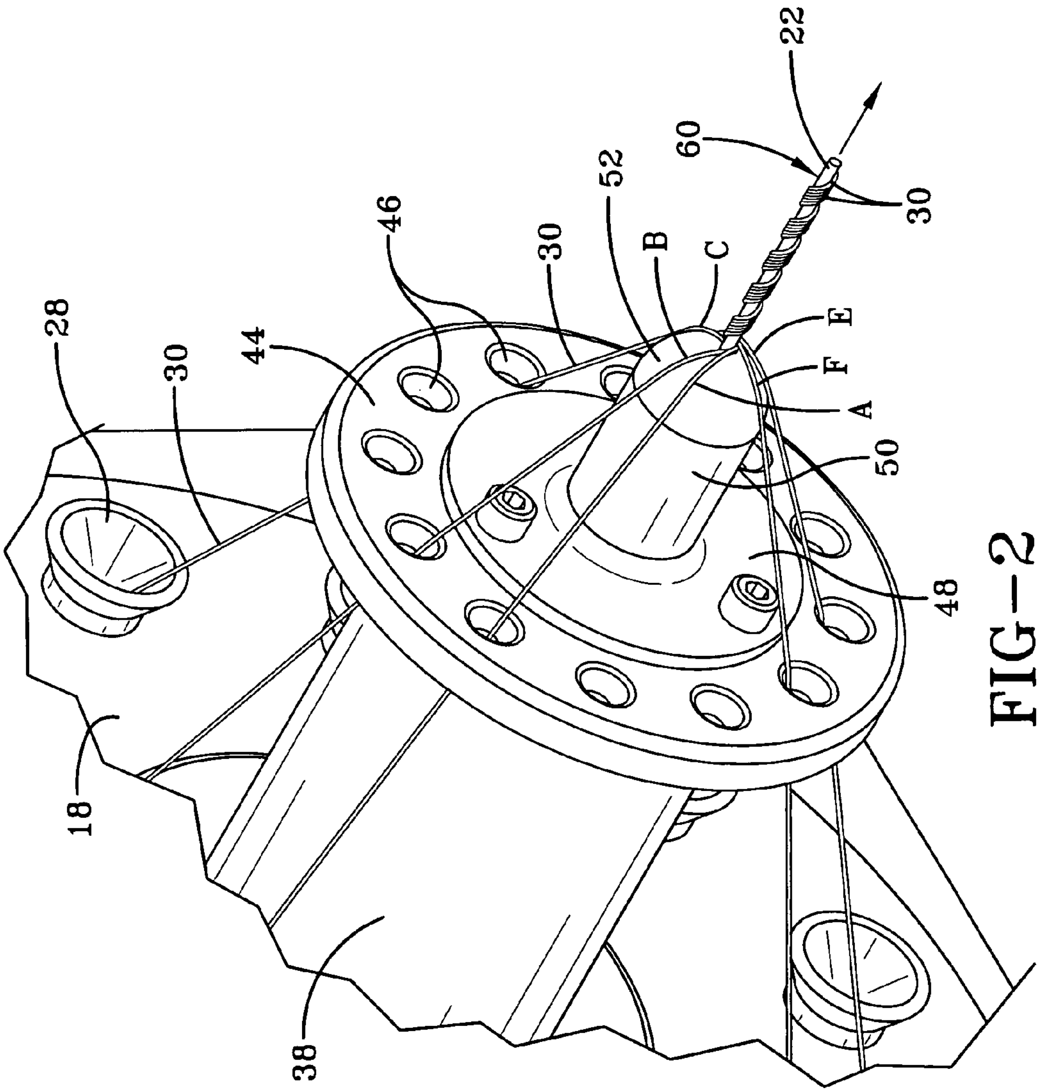
FIG. 2 is an enlarged front perspective view of the mandrel.
Figure 3:
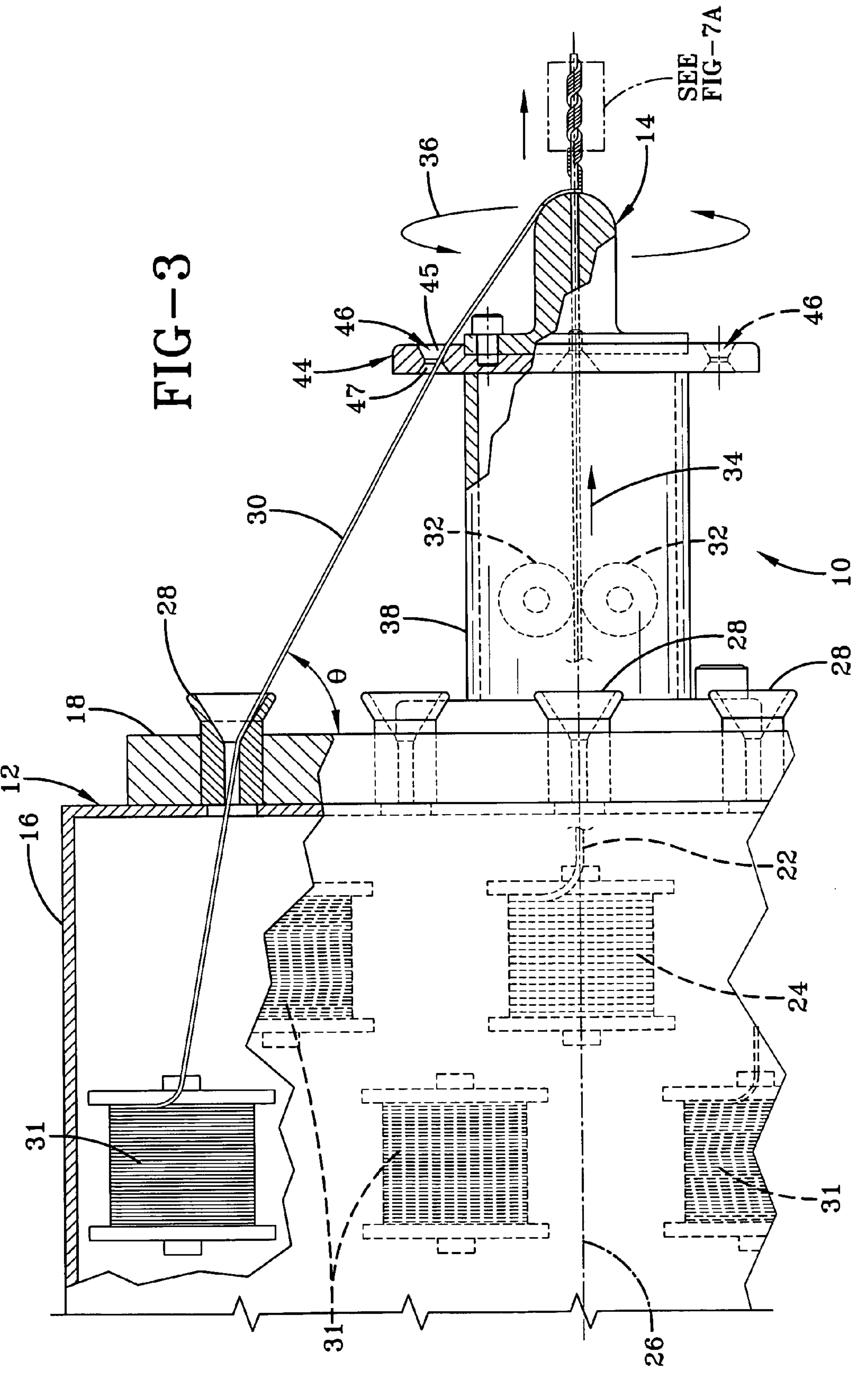
FIG. 3 is a longitudinal section view through a cable strander and mandrel.

With initial reference to FIGS. 1, 2, and 3, a station for forming a wound cable is shown generally at 10. The subject mandrel 14 is mounted forward in assembly 10 and is intended for use in conjunction with a tubular strander 12 housed within enclosure 16. The strander 12 includes a rotary plate 18 rotationally mounted to a forward face of the enclosure 16. A centrally disposed cable core outlet 20 extends through the plate 18 on a longitudinal axis 26 of the enclosure 16. A cable core 22 is fed along the axis 26 from a spool 24. For electrical cable construction, core 22 will be formed from a non-conductive material or composite.

An array of circumferentially disposed, spaced apart through bores or outlets 28 extend through the rotary plate 18. Each outlet 28 is generally frustro-conical in cross section at a forward end and communicates at a rearward end with the interior of enclosure 16. Multiple secondary strands 30 are routed from spools 31 within enclosure 16 through the outlets 28 as shown. The spools 31 are spaced apart so that each secondary strand 30 aligns generally with a respective outlet 28. The spools 31 feed each secondary strand 30 into its respective outlet 28 under tension as will be explained.

The cable core 22 and secondary strands 30 are pulled along the longitudinal axis 26 in an axial direction designated by numeral 34. The plate 18 is rotated in a controlled fashion in direction 36 relative to enclosure 16 by a conventional drive mechanism (not shown). The rotation of plate 18 causes co-extensive rotation of the secondary strands 30 extending through plate 18 in the direction 36. Fixedly attached to the forward side of enclosure 16 is a cylindrical projection 38. Projection 38 has a rearward annular flange 40 that affixes to the enclosure 16 by means of mounting bolts 42. At a forward end of the projection 38 is a peripheral annular flange 44. A circumferential array of through-bores 46 are disposed through the annular flange, the location of each bore 46 generally aligning with a corresponding respective bore 28 in the rotary plate 18. Each bore 46 is profiled in longitudinal section to provide frustro-conical leading 45 and trailing 47 portions that funnel a respective secondary strand 30 through the flange 44.

Figure 4:
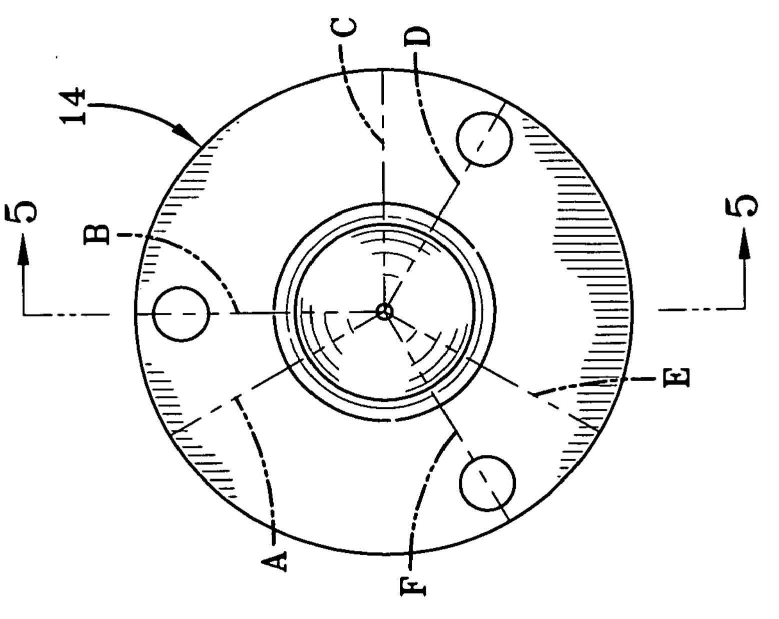
FIG. 4 is a front plan view of the mandrel of FIG. 3.
Figure 5:
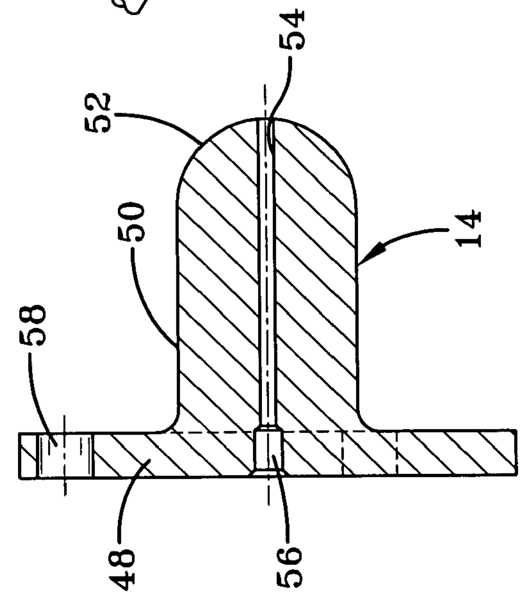
FIG. 5 is a longitudinal section view through a mandrel.

With reference to FIGS. 4 and 5, the mandrel 14 is formed of a suitably rigid material such as steel. Mandrel 14 includes a rearward annular flange 48, an elongate cylindrical body 50, and a radiused forward end 52. An axial passageway 54 having an enlarged lead-in rearward entry 56 is provided extending through the mandrel 14 from a rearward end to a forward end. Mounting apertures 58 extend through the flange 48 and provide means for fixed attachment of the mandrel 14 to the rotational plate 18. The forward radiused end 52 of mandrel 14 is preferably smooth and hemispherical in configuration. The end 52 has a radiused outward surface that curves continuously forward to an axially disposed forward opening of the passageway 54.

Figure 6:
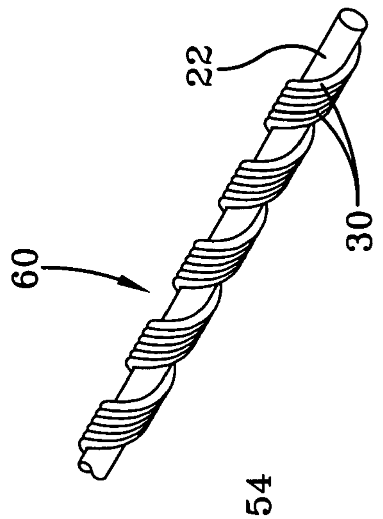
FIG. 6 is an enlarged perspective view of a wound cable segment.

Passageway 54 of the mandrel 14 is dimensioned in section to closely admit the cable core component 22 of the finished cable 60 as will be appreciated from FIG. 6. The wound cable 60 is configured having an axial cable core component 22 that has an effectively round shape and a helically wound bundle of secondary strands 30 wrapped around the core 22. Controlled spacing of the strands 30 relative to each adjacent strand and to the core 22 is important for the cable 60 to electrically function for its intended purpose. Cable 60 may be useful in its construction as an antenna for transmission and reception of radio frequency signals, for example.

From FIGS. 1, 2, and 3, operation of the mandrel 14 in conjunction with the strander 12 will be explained. The cable core component 22 is pulled from the reel 24 along an axial centerline by conventional means which is downstream of the claimed invention. The component 22 projects through the outlet 20, along the axis of the cylindrical projection 38, and into the mandrel 14. Within the mandrel passage, the cable core 22 extends axially forward to exit from a forward end of the mandrel 14. Secondary strands 30 of preferred number are fed from the reels 31 through respective outlets 28 within rotational plate 18. Upon exiting the plate 18, the secondary strands 30 are routed along respective convergent paths toward and through respective guide passages 46 of the mandrel flange 44. The reels 31 are located so that the secondary strand 30 fed therefrom will be generally aligned with its associated passageway 28 in plate 18 and its associate passageway 46 of mandrel flange 44.

Each strand 30 tangentially intersects a respective region A, B, C, D, or E of the forward radiused portion 52 of the mandrel 14. Regions A, B, C, D, and E are spaced about the circumferential periphery of the mandrel end 52 so that the strands 30 will not interfere and become entangled with each other during the winding operation. Each strand 30, upon intersecting the mandrel end 52, follows the radius of curvature of the mandrel end 52 to the forward outlet of mandrel passageway 54 and the cable core 22 exiting therefrom. The multiple secondary strands 30 thus converge upon respective, separated regions of the mandrel end 52 and thereupon follow respective, separated paths along the curvature of mandrel end 52 to converge and meet at the cable core 22.

The strands 30 are wound around the cable core 22 by the rotation of rotary plate 18 as the cable core 22 is axially advanced. The strands 30 follow an optimized approach angle $\theta$ (FIG. 3) between the rotational plate 18 and the mandrel end 52 of approximately 45 degrees. This approach angle is equal for all of the strands 30. The spacing of intersection regions A, B, C, D, and E with the maintenance of a common approach angle $\theta$ for each strand 30 prevents crossover of the strands 30. That is, intersection of the outer secondary strands 30 with each other is prevented.

From the foregoing, it will be appreciated that the mandrel 14 works in conjunction with the strander apparatus 12 to create a wound cable construction of uniform twist and configuration. The mandrel may be fitted at the forward end of the strander and does not interfere with other components. The radiused forward end of the mandrel acts to separate the strands 30 and to keep their approach paths at an optimum, equal approach angle. The mandrel forward radiused end allows the strands 30 to follow the radius surface to meet at the cable core.

Figure 7A:
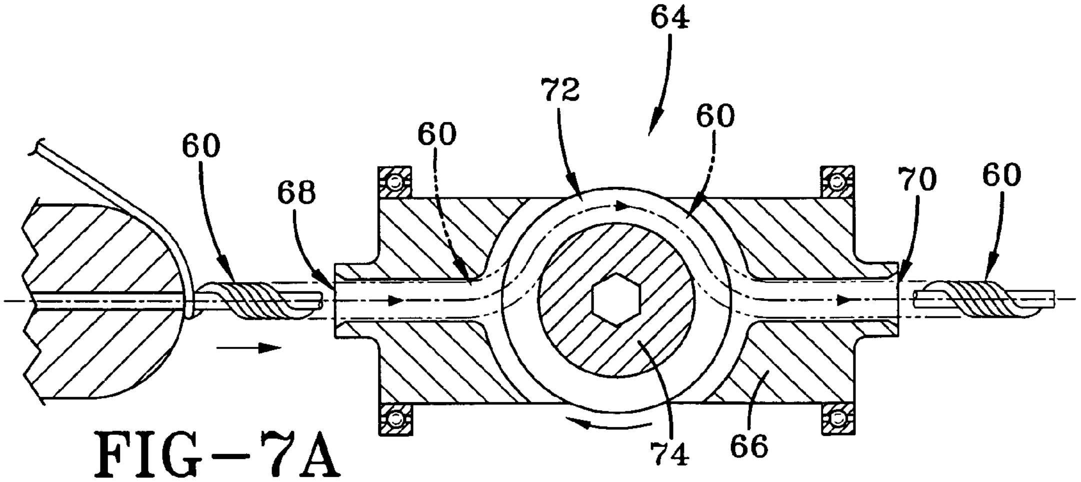
FIG. 7A is a longitudinal section view through an overtwister device used in conjunction with the cable strander apparatus.

With reference to FIGS. 3 and 7A, the subject strander apparatus may be used in conjunction with an overtwister device 64 situated downstream from the strander operation. The overtwister device 64 is intended to eliminate residual twist in the cable 60. Residual twist forces in cable 60 are the result of twisting the secondary, spring-like secondary strands 30 about the cable core 22. Such forces may tend to unwind or further wind the cable after the winding operation is complete. Thus, removing the residual forces in the cable 60 is important to create a well-behaved cable suitable for deployment as a finished product. The overtwister device 64 has a housing 66 through which a passageway 72 extends, from a passageway inlet 68 to a passageway outlet 70. A rotational pulley 74, driven by conventional means, is situated within the housing 66 and the cable 60 within passageway 72 is routed over the pulley 74 and out of the outlet 70. In passing over the pulley 74, an overtwist is imparted into the cable. Once the cable 60 passes out of the pulley, the overtwisted cable relaxes, removing any residual forces within the cable that could cause a change in the cable twist geometry. It is through the overtwisting and relaxing operation on the cable by the overtwist device 64 that residual forces within the cable from the winding operation are removed.

Figure 7B:
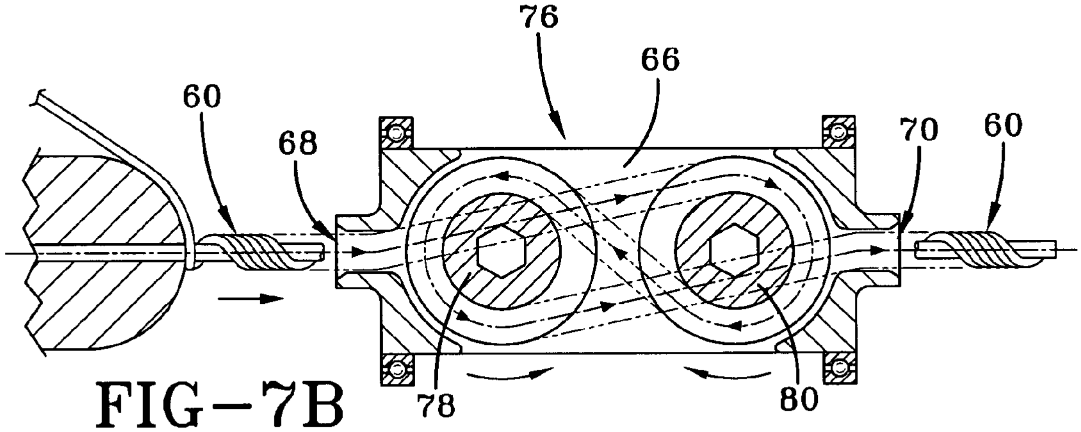
FIG. 7B is a longitudinal section view through a first alternative overtwister device.
Figure 7C:
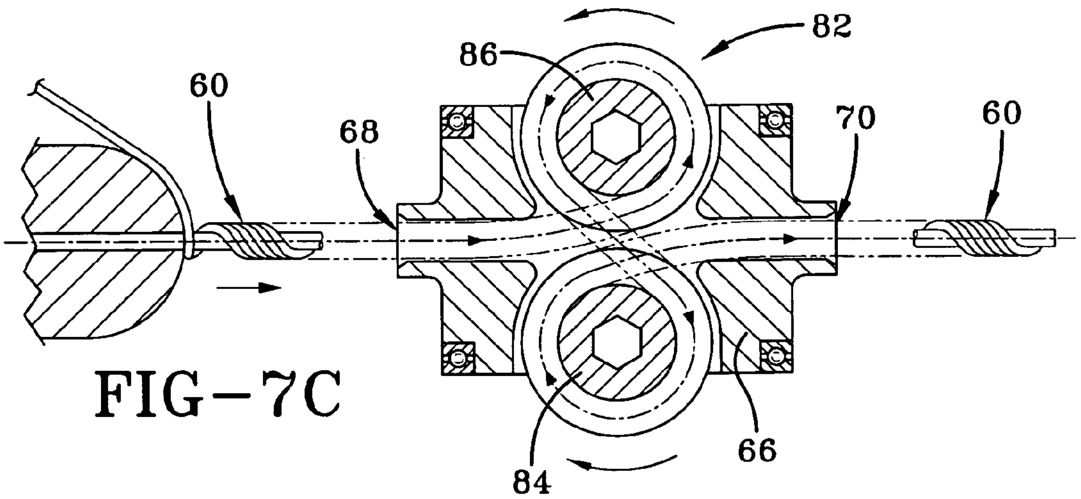
FIG. 7C is a longitudinal section view through a second alternative overtwister device.

FIG. 7B shows an alternative embodiment for an overtwister device 76 employing a series of pulleys 78, 80. The cable 60 may be routed over and around the pulleys 78, 80. Rotation of the pulleys 78, 80 by a conventional drive means will overtwist the cable 60. Once the cable 60 exits the second pulley 80, residual forces within the cable will dissipate. FIG. 7C shows a second alternative embodiment of an overtwister device 82 employing a vertically arranged pair of pulleys 84, 86. The cable 60 is routed over the pulleys 84, 86 in a figure eight path. Rotation of the pulleys 84, 86, as with the other overtwister devices, places the cable 60 in an overtwisted state. Once the cable 60 exits the device 82 residual forces within the cable 60 will be eliminated as the cable relaxes. As a result, the cable 60 will not wind or unwind and may be handled in a relaxed state.

The invention includes an apparatus and a method for making a wound conductor. The method of manufacture includes: feeding a cable core along a feed path; axially guiding one or more secondary strand(s) from a location offset from the cable core toward the cable core at an approach angle; routing the cable core through a forwardly disposed mandrel body; intersecting a radiused forward end of the mandrel body by the secondary strand(s); routing the secondary strand(s) over the radiused forward end of the mandrel body to an intersection with the cable core; and rotating the secondary strand(s) and the mandrel body about the cable core to create a finished wound conductor. The method may also include imparting an overtwist into the finished wound conductor to rid the finished wound conductor of residual stress forces.

Accordingly, the subject invention accomplishes the achievement of a strander apparatus and method that can maintain an optimal spatial relationship between radially fed secondary wire conductors and an axial conductor core while the conductors are rotated into a wound conductor construction. The strander apparatus and method allows for careful control of the approach angle between the secondary wire conductors and the conductor core and is thus capable of maintaining a desired pitch and twist per lay length of finished product. Moreover, the apparatus and method provides for the elimination of residual twist stresses from the wound wire construction by routing the wound conductor through an overtwist station.

Variations in the present invention are possible in light of the description of it provided herein. While certain representative embodiments and details have been shown for the purpose of illustrating the subject invention, it will be apparent to those skilled in this art that various changes and modifications can be made therein without departing from the scope of the subject invention. It is, therefore, to be understood that changes can be made in the particular embodiments described which will be within the full intended scope of the invention as defined by the following appended claims.

What is claimed is:

1. Apparatus for making a helically wound conductor of the conductor type having an axial cable core and at least one secondary strand helically wound around the cable core, the apparatus comprising:

- a pulling mechanism for axially advancing the cable core and secondary strands;
- a guide mechanism for axially directing the at least one secondary strand from a location offset from the cable core toward the cable core at an approach angle;
- a mandrel body disposed at a forward end of the apparatus, the mandrel body having an axial passageway extending from a rearward to the forward end of the mandrel body dimensioned to axially receive the cable core therethrough and a forward radiused end positioned to intercept the at least one secondary strand and;
- means for rotating the at least one secondary strand and the mandrel about the cable core.

2. The apparatus according to claim 1, wherein the radiused end of the mandrel body is substantially hemispherical.

3. The apparatus according to claim 2, wherein the axial passageway at the forward end of the mandrel body is dimensioned to axially guide a cable core therethrough.

4. The apparatus according to claim 1, wherein the mandrel body forward end is radiused and positioned for a tangential intersection by the at least one secondary strand at the approach angle.

5. The apparatus according to claim 1, wherein the guide mechanism comprises spaced apart forward and rearward eyelets suspending the at least one secondary strand therebetween at the approach angle, the forward eyelet being positioned adjacent the mandrel body.

6. The apparatus according to claim 5, wherein further comprising a forwardly projecting support body having a rotational member at a forward end, the mandrel body being affixed to and rotating with the rotational member.

7. The apparatus according to claim 6, wherein the forward eyelet is affixed to and extends through the rotational member, the at least one secondary strand extends through the forward eyelet to the mandrel body and rotates with the rotational member.

8. The apparatus according to claim 1, further comprising an overtwister assembly disposed to receive the helically wound conductor from the mandrel body, the overtwister assembly comprises a housing having a conductor receiving inlet and a conductor discharging outlet, and at least one rotating pulley disposed within the housing positioned to engage the conductor and impart stress forces into the conductor between the housing inlet and outlet.

9. The apparatus according to claim 8, wherein the at least one pulley has a conductor receiving groove therein.

10. A strander apparatus for making a helically wound conductor of the conductor type having an axial cable core and at least one secondary strand helically wound around the core, the apparatus comprising:

- a pulling mechanism for axially advancing a cable core and secondary strands;
- a guide mechanism for axially directing at least one secondary strand toward the cable core at an approach angle;
- means for rotating the at least one secondary strand about the cable core;
- a mandrel body disposed at a forward end of the strander apparatus, the mandrel body having a forward radiused end and an axial passageway extending from a rearward to the forward end of the mandrel body dimensioned to axially receive the cable core therethroug;
- wherein the at least one secondary strand intersects the cable core at the forward end of the mandrel body.

11. The strander apparatus according to claim 10, wherein the radiused end of the mandrel body is substantially hemispherical.

12. The strander apparatus according to claim 10, wherein the at least one secondary strand tangentially intersects the mandrel body forward end at the approach angle and follows the curvature of the mandrel body forward end to intersect with the cable core.

13. The strander apparatus according to claim 10, wherein the guide mechanism comprises spaced apart forward and rearward eyelets suspending the at least one secondary strand therebetween at the approach angle, the forward eyelet being positioned adjacent the mandrel body.

14. The strander apparatus according to claim 13, wherein further comprising a forwardly projecting support body having a rotational member at a forward end, the mandrel body being affixed to and rotating with the rotational member.

15. The strander apparatus according to claim 14, wherein the forward eyelet is affixed to and extends through the rotational member, the at least one secondary strand extends through the forward eyelet to the mandrel body and rotates with the rotational member.

16. The strander apparatus according to claim 10, further comprising an overtwister assembly disposed to receive the helically wound conductor from the mandrel body, the overtwister assembly comprises a housing having a conductor receiving inlet and a conductor discharging outlet, and at least one rotating pulley disposed within the housing positioned to engage the conductor and impart stress forces into the conductor between the housing inlet and outlet.

17. The strander apparatus according to claim 16, wherein the at least one pulley has a conductor receiving groove.

* * * * *